Nov. 28, 1961 R. THATTE 3,011,127

VARIABLE RADIX BINARY DIVIDER

Filed March 6, 1959

INVENTOR:
Raghunath Thatte
BY:
Baldwin & Wight
ATTORNEYS 3,011,127
Patented Nov. 28, 1961

3,011,127

VARIABLE RADIX BINARY DIVIDER

Raghunath Thatte, Great Baddow, England, assignor to Marconi's Wireless Telegraph Company Limited, London, England, a British company Filed Mar. 6, 1959, Ser. No. 797,687
Claims priority, application Great Britain Mar. 28, 1958
6 Claims. (Cl. 328—48)

Figures 1, 2:
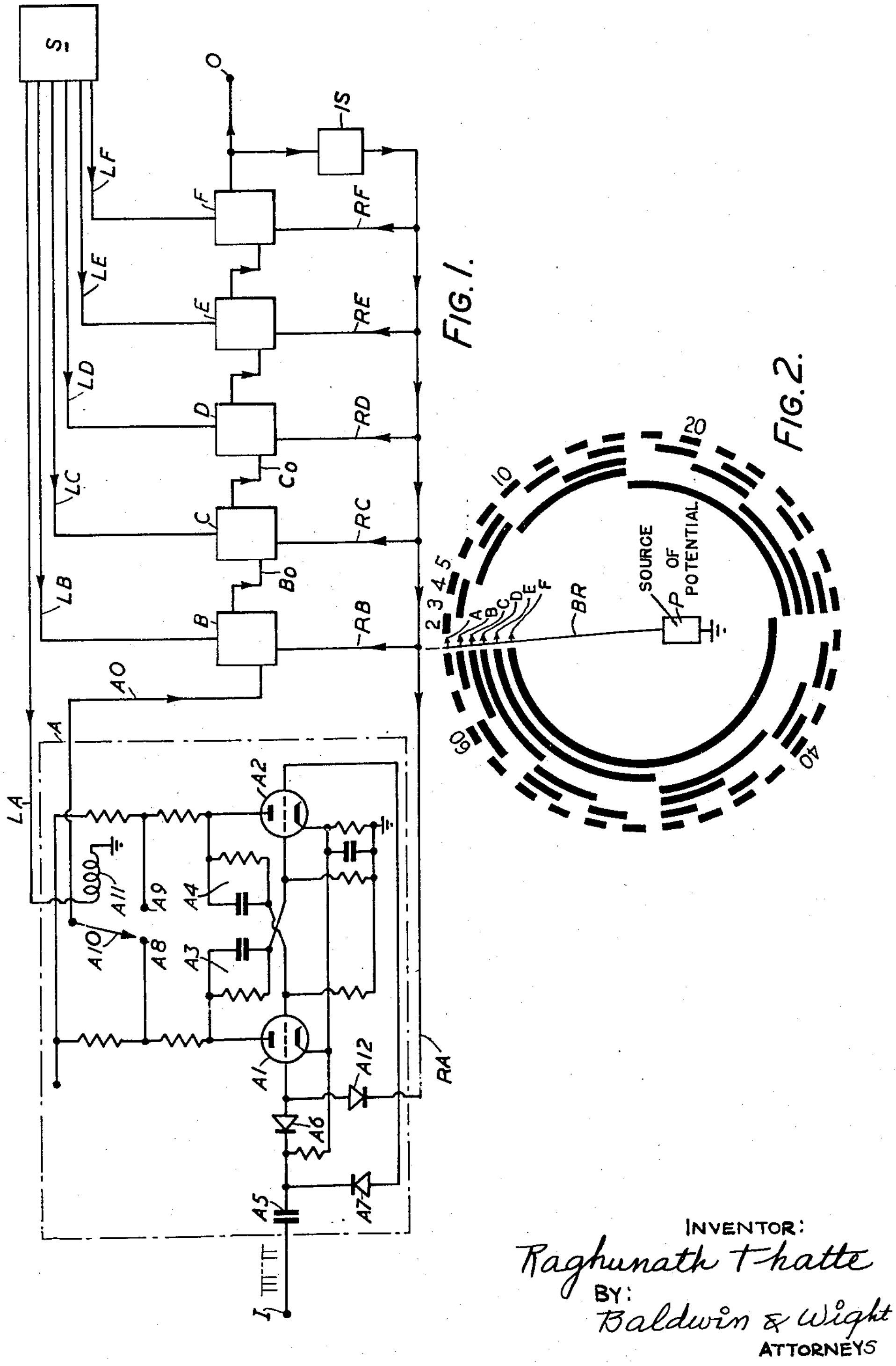

This invention relates to binary frequency dividers and has for its object to provide improved frequency dividers adapted to divide the frequency of an input train of pulses of predetermined polarity by any desired divisor up to a desired predetermined maximum value.

Frequency dividers of variable divisor are, of course, known per se, but in general they are complex and are also rather severely limited as to the frequency of input pulses they can handle. For example, known frequency dividers using gas discharge tubes of the so-called Dekatron or similar types in which a gas discharge is moved by successive input pulses from one to another of a series of electrodes in a Dekatron or like tube will not handle input frequencies of the order of several kilocycles per second because of the length of time required by the tube to switch the discharge from one electrode to another. The present invention provides improved frequency dividers which are simple, do not involve the use of special multi-electrode or other gas discharge tubes and can handle relatively high frequencies up to the order of 100 kc./s. or more.

According to this invention a variable divisor frequency divider comprises a cascaded series of triggerable flip-flops each comprising two stages which are cross-coupled so that when one is conductive the other is not, and vice versa; switch means for each flip-flop adapted to take output from either of the two stages thereof at will; connections between a source of pulses of predetermined polarity and which are to be divided in frequency and the trigger control points of both stages of the first of said series of flip-flops; connections between the switch means of each flip-flop, except the last, and the trigger control points of both stages of the next succeeding flip-flop; and connections between the switch means of the last of said series of flip-flops and a final output point on the one hand and a trigger control point in each of the preceding flip-flops on the other. As will be seen later, with such a frequency divider any whole number divisor up to a maximum determined by the number of flip-flops in the series can be obtained by suitable selection of the positions of the switches in the individual flip-flops.

There are numerous known forms of triggerable bi-stable flip-flops, any of which can be used in carrying out the invention, but the preferred type is the Eccles-Jordan type of flip-flop. This is a two-stage direct coupled valve circuit in which the anode of each valve is resistance coupled to the control grid of the other so that in one of the two stable states one only of the two valves is conducting and in the other stable state the other only of the two valves is conducting. The trigger control points are the control grids of the valves, and, as is well known, change-over from one state to the other can be effected by applying a positive pulse to the grid of that valve which is for the moment cut off or by applying a negative pulse to the grid of that valve which is for the moment conductive to change the state of conductivity of the valve in question. Eccles-Jordan flip-flops, like other flip-flops, may, of course, employ equivalent transistors instead of valves. In most cases, however, flip-flops employing valves will be employed in carrying out this invention.

According to a feature of this invention a variable divisor frequency divider comprises a cascaded series of triggerable bi-stable flip-flops each comprising two valves with the anode of each D.C. coupled to the control grid of the other said control grids constituting the trigger control points of the flip-flop, switch means in each flip-flop adapted to make connection at will between either anode thereof and an output line; connections between a source of pulses of predetermined polarity and which are to be divided in frequency and both control grids of the first flip-flop; connections between the output line of each flip-flop except the last, and both control grids of the next flip-flop in the series; and connections between the output line of the last flip-flop in the series and a final output point on the one hand and one control grid in each of the preceding flip-flops on the other.

Preferably each of the connections to the trigger control points of the flip-flops includes a uni-laterally conductive device poled to pass only pulses of a predetermined polarity.

The switches may be of any suitable known form, either electronic or mechanical switches. Normally, however, in carrying out this invention relay switches will be used.

Selection of the positions of the switches to select the divisor can be effected in any way, even manually and independently for the individual switches. In practice, however, it is preferred to select the positions of the switches by a multi-position control switch arrangement adapted, in each position thereof, to set up a different combination of positions for the switches controlled. Such a multi-position control switch arrangement, which may conveniently be a rotary binary switch or a decade switch arrangement, may then have each of its different positions marked with the value of the divisor obtained when it is moved to that position.

The various features of this invention will be more clearly understood from a reading of the detailed description of the invention in conjunction with the drawing in which:

FIGURE 1 is a combined schematic and block diagram of one illustrative embodiment of this invention, and FIGURE 2 is a combined schematic and block diagram of a rotary selector switch employed in the illustrative embodiment of this invention.

The particular embodiment illustrated is adapted to operate to divide the frequency of an input train of negative going pulses but obviously, by changes which will be obvious to those skilled in the art, it could be modified to divide a positive going pulse train in frequency. Again, the illustrated embodiment has six flip-flops and will therefore divide by any divisor up to $2^6=64$, but any number $n$ of flip-flops may be provided to give any divisor up to $2^n$.

Referring to FIGURE 1, the frequency divider therein shown includes six triggerable bi-stable flip-flops each of the Eccles-Jordan type. These flip-flops are all alike and accordingly only the first of them, which is within the chain rectangle A, is shown in detail, the other flip-flops B, C, D, E and F being represented merely by blocks. A train of negative going input pulses which is to be divided in frequency is applied from the input terminal I to the flip-flop A. As shown this flip-flop comprises two valves A1 and A2 each having its anode D.C. coupled as shown to the control grid of the other, the D.C. coupling circuits, each of which consists of a capacity shunted resistor, being represented at A3 and A4. Input pulses from terminal I are applied through condenser A5 and a crystal or other rectifier A6 to the control grid of the valve A1 and are also supplied through the same condenser A5 and a crystal or other rectifier A7 to the control grid of the valve A2. The impulses are such that if either of the valves A1 or A2 is conductive (the other being then, of course, non-conductive) the application of a negative going input pulse to its grid will change it to the cut-off condition and also, of course, change the said other valve to the conductive condition. Suitably selected points in the two anode circuits are taken to the contacts A8 and A9 of a two-position switch having an armature A10 and constituted in the example illustrated by a relay having an operating coil A11. Dependent upon whether or not the operating coil is energised, the switch arm A10 will make contact with one or other of the two contacts A8, A9.

Switched output from the switch armature A10 is fed to the second flip-flop B via a lead marked AO. This lead connects through a condenser (not shown) in the flip-flop B and corresponding to the condenser A5 of flip-flop A and through rectifiers corresponding to the rectifiers A6 and A7 of the flip-flop A to the two grids of the two valves of the flip-flop B. A switch arrangement exactly like that of flip-flop A is provided in flip-flop B and the switched output taken over a lead BO to the next flip-flop C which again feeds its switched output through a lead CO to the next flip-flop D and so on until the final flip-flop F is reached. The switched output from this flip-flop consists of the final divided output frequency and is fed to a utilisation output terminal O and also through any suitable known isolating stage IS to the control grid of the first valve A1 of the flip-flop A through a lead RA in which is inserted a crystal or other diode A12. Output from the isolating stage IS is also fed over leads RB, RC, RD, RE and RF to the first valves in the flip-flops B, C, D, E and F in exactly the same way as is shown for the flip-flop A.

Energisation of the relay coil A11 is effected over a lead LA from a selector switch arrangement S which also controls the energisation of the relay coils in the flip-flops B to F inclusive over leads LB, LC, LD, LE and LF. The selector switch S, an example of which will be described with reference to FIGURE 2, is a multi-position switch adapted in each of its 64 different positions, to produce a different combination of energised leads LA to LF, from having none of them energised to having all of them energised. Each of the 64 individual positions of the switch may be marked with the value of divisor (which can be any value between 1 and 64) obtained in that position of the switch.

Suppose in the arrangement of FIGURE 1 that the valve A1 is non-conducting and the valve A2 conducting, the valve corresponding to A1 in all the other flip-flops being similarly initially non-conducting and the other valves in all the other flip-flops being initially conducting. If, in this condition, a negative pulse appears at terminal I, the valve A2 will be cut-off, the valve A1 will be rendered conducting and a negative pulse will appear at the anode of the valve A1. If the switch A10 is in the position shown, this negative pulse will be applied over lead AO to the flip-flop B and change the state of that flip-flop. If all the switches in the flip-flops B, C, D, E and F are in the same positions as the switch A10, each flip-flop will be similarly changed over as to its state of equilibrium by the negative pulse from the preceding flip-flop and a negative going pulse will appear at the terminal O and also be fed back to the valve A1 and to all the corresponding valves in the other flip-flops. All these valves will accordingly be switched back to the non-conductive condition and all the other valves will be changed back to the conducting condition. The switching of valve A2 and corresponding valves back to the conducting condition will produce, in each case, a negative pulse in the anode circuit of the valve in question, but these negative pulses will be of no effect because of the positions of the switch arm A10 and the other corresponding switches. Each successive input pulse will produce the same result and the arrangement will therefore be a divisor of unity, i.e. the output frequency will be the same as the input frequency.

Suppose now the switch arm A10 is moved over to contact A9, the switches in the other flip-flops being, however, as before, i.e. with the switch arms on the contacts corresponding to A8. With this setting of the switches the first negative input pulse to flip-flop A will change over the state of that flip-flop as before making the valve A2 non-conductive and valve A1 conductive. A negative going pulse will, therefore, again appear at terminal A8, but it will not be transferred to the next flip-flop B because of the position of the switch arms A10. Flip-flops B to F inclusive will therefore be unaffected and there will be no output pulse. The second input pulse to flip-flop A will, however, change back the valve A1 to the non-conductive condition, producing a negative pulse at the contact A9. This pulse is transferred to flip-flop B which changes its state and passes a pulse to the next flip-flop and so on all down the series so that all the flip-flops B to F change state producing an output pulse at O which is fed back and is effective to return all the flip-flops B to F to the original state. All six flip-flops are accordingly now in their original states with their left hand valves cut off. This cycle accordingly repeats. Thus each odd numbered pulse—the 1st, 3rd, 5th . . . and so on—produces no output pulse but each even numbered pulse does produce an output pulse. Thus, with the switches in the positions stated, i.e. the switch in flip-flop A in the right hand position and all the others in their left hand positions, the frequency divider will divide by the factor 2 and the output frequency at O will be one half the input frequency at I. It may be shown that if all the switches are moved to their right hand positions each successive flip-flop will contribute a factor of 2 to the divisor and the divider will divide the input frequency by the divisor $2^n$, where $n$ is the number of flip-flops, i.e. it will divide by 64 in the case illustrated, in which there are six flip-flops. It may be shown that any value of divisor between 1 and 64 can be obtained by setting up a different combination of switches in the six flip-flops.

FIGURE 2 shows one form of rotary selector switch which may be used for the control of the switches in the flip-flops. This slector switch is purely diagrammatically represented and comprises a brush arm represented diagrammatically by the arrow headed line BR having six brushes (not shown) each of which moves, when the switch is rotated, over a different one of six concentric rings of contacts represented by arcuate black lines. Each of the six brushes on the brush arm is connected to a different one of the six relay coils—one in each flip-flop—the brush running over the outermost ring of contacts being connected to the relay coil in flip-flop A, the brush running over the next ring of contacts being connected to the relay coil in flip-flop B, and so on, the brush running over the innermost contact ring (which consists of only one contact) being connected to the relay coil in flip-flop F. It will be seen that the contacts are in binary arrangement, the outermost ring consisting of 32 contacts, the next ring consisting of 16 contacts, the next ring of 8 contacts . . . and so on. Each of the individual contacts in the outermost ring is of half the arcuate span of each of the individual contacts in the next innermost ring and each of this is, in turn, of half the arcuate span of each individual contact in the next ring . . . and so on. Energising potentials for the relay coils is supplied through the selector switch from a potential source represented at P. It will be apparent that, in each of the 64 positions of which the selector switch is capable, a different one of the 64 possible combinations of relay coils energised is achieved. Certain of these positions are indicated by numbers in FIGURE 2, namely positions 1, 2, 3, 4, 5, 10, 20, 40 and 60. In position 1 none of the relay coils is energised; in position 2 only the relay coil in flip-flop A is energized; in position 10, for example, only the relay coils in flip-flops A and D are energised . . . and so on in manner that will be obvious from FIGURE 2. If it be assumed that energisation of any relay coil moves its associated switch into the right hand position, e.g. if it be assumed that energisation of coil A11 moves switch arm A10 over on to contact A9, then it will be seen that the value of the divisor given by the frequency divider will correspond to the numbered position of the selector switch. Thus, for example, if the switch of FIGURE 2 is moved to position 20, the relays in flip-flops A, B and E will be energised and consideration will show that the frequency divider will divide the input frequency by 20.

The main component elements in this divider, namely the flip-flops, are simple, reliable, valve circuits; the switching changes required are simple and easily effected; a great number of possible division factors are obtainable from a comparatively small number of flip-flops; and the apparatus will handle any input frequency up to the relatively high capacity of the flip-flops.

I claim:

1. A variable divisor frequency divider circuit comprising a cascaded series of triggerable flip-flops each comprising two stages which are cross-coupled so that when one is conductive the other is not, and vice versa, and each stage having a trigger control point; means for applying pulses which are to be divided in frequency to the trigger control points of both stages of the first of said series of flip-flops; switch means for each flip-flop for selecting output from either of the two stages thereof; means for applying the selected output from each flip-flop, except the last to the trigger control points of both stages of the next succeeding flip-flop; means for applying selected output from the last of said series of flip-flops to a final output point; and means for applying selected output from the last of said series of flip-flops to a trigger control point in each of the preceding flip-flops.

2. A frequency divider as claimed in claim 1 wherein the flip-flops are of the Eccles-Jordan type.

3. A variable divisor frequency divider comprising a cascaded series of triggerable bi-stable flip-flops each comprising two valves with the anode of each D.C. coupled to the control grid of the other said control grids constituting the trigger control points of the flip-flops; switch means in each flip-flop for selecting output from either anode thereof; connections between a source of pulses of predetermined polarity and which are to be divided in frequency and both control grids of the first flip-flops; means for applying the selected output from each flip-flop except the last, to both control grids of the next flip-flop in the series; and means for applying selected output from the last flip-flop in the series to a final output point on the one hand and one control grid in each of the preceding flip-flops on the other.

4. A frequency divider as claimed in claim 1 wherein the means for applying the selected output to each of the trigger control points of the flip-flops includes a unilaterally conductive device poled to pass only pulses of a predetermined polarity.

5. A frequency divider as claimed in claim 1 wherein the positions of said switch means to select the divisor is effected by a multi-position switch device having a plurality of positions each adapted to select switch means positions giving a different divisor.

6. A frequency divider as claimed in claim 3, wherein selection of the positions of the switch means to select the divisor is effected by a multi-position switch device having a plurality of positions each adapted to select switch means positions giving a different divisor.

References Cited in the file of this patent

UNITED STATES PATENTS

| | | |
|---|---|---|
| 2,563,841 | Jensen | Aug. 14, 1951 |
| 2,627,033 | Jensen | Jan. 27, 1953 |
| 2,697,549 | Hobbs | Dec. 21, 1954 |

FOREIGN PATENTS

| | | |
|---|---|---|
| 311,964 | Switzerland | Feb. 15, 1956 |